(12) United States Patent
Jolain et al.

(10) Patent No.: US 10,315,373 B2
(45) Date of Patent: Jun. 11, 2019

(54) SELF-LOCKING MOLD COMPRISING A SHOULDER SPACER FOR MOLDING AND VULCANIZATION OF TIRES

(71) Applicant: COMPAGNIE GENERALE DES ETABLISSEMENTS MICHELIN, Clermont-Ferrand (FR)

(72) Inventors: Florent Jolain, Clermont-Ferrand (FR); Tommaso Ottaiano, Clermont-Ferrand (FR); Jean-Claude Aperce, Clermont-Ferrand (FR); Florian Ferriere, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/757,866

(22) PCT Filed: Nov. 30, 2016

(86) PCT No.: PCT/EP2016/079295
§ 371 (c)(1),
(2) Date: Mar. 6, 2018

(87) PCT Pub. No.: WO2017/108359
PCT Pub. Date: Jun. 29, 2017

(65) Prior Publication Data
US 2018/0326681 A1 Nov. 15, 2018

(30) Foreign Application Priority Data
Dec. 21, 2015 (FR) ...................................... 15 62931

(51) Int. Cl.
*B29D 30/06* (2006.01)
*B29C 33/20* (2006.01)

(52) U.S. Cl.
CPC ........ *B29D 30/0606* (2013.01); *B29C 33/202* (2013.01); *B29D 30/0629* (2013.01);
(Continued)

(58) Field of Classification Search
CPC ............ B29D 30/0606; B29D 30/0629; B29D 2030/0607; B29D 2030/0618; B29C 33/202

See application file for complete search history.

(56) References Cited

U.S. PATENT DOCUMENTS

| 3,990,823 A | 11/1976 | Le Moullac | 425/47 |
| 4,013,390 A | 3/1977 | Moeller et al. | 425/47 |

(Continued)

FOREIGN PATENT DOCUMENTS

| EP | 0 436 495 A1 | 7/1991 |
| EP | 0 522 374 A1 | 1/1993 |

(Continued)

OTHER PUBLICATIONS

Feb. 3, 2017 International Search Report and Written Opinion in International Patent Appln. No. PCT/EP2016/079295.

*Primary Examiner* — James P Mackey
(74) *Attorney, Agent, or Firm* — Venable LLP (57) ABSTRACT

A self-locking mold (100) includes sectors (108) circumferentially distributed around a shell (102) to resist internal pressure and remain in the closed position without the aid of additional components during curing. The mold (100) includes shoulder spacers (120) that, in the closed position of the mold, are arranged between the shell (102) and the sectors (108). An elastic means (130) is employed so as to avoid friction between them.

14 Claims, 5 Drawing Sheets

(52) U.S. Cl.
CPC ............... *B29D 2030/0607* (2013.01); *B29D 2030/0618* (2013.01)

(56) References Cited

U.S. PATENT DOCUMENTS

| | | | |
|---|---|---|---|
| 5,180,592 A | 1/1993 | Laurent | 425/46 |
| 5,269,669 A | 12/1993 | Ladouce | 425/47 |
| 7,459,117 B2 * | 12/2008 | Girard | B29D 30/0629 156/110.1 |
| 7,862,317 B2 * | 1/2011 | Menard | B29C 33/305 425/47 |
| 8,303,286 B2 * | 11/2012 | Menard | B29C 33/305 425/47 |
| 9,096,006 B2 | 8/2015 | Ferrand et al. | B29C 43/203 |
| 9,205,574 B2 * | 12/2015 | Ferrand | B29C 33/20 |
| 2006/0125147 A1 | 6/2006 | Bachochin et al. | 264/326 |
| 2016/0193797 A1 | 7/2016 | Villeneuve et al. | B29D 30/0606 |

FOREIGN PATENT DOCUMENTS

| | | |
|---|---|---|
| FR | 2 983 117 A1 | 5/2013 |
| FR | 3 009 230 A1 | 2/2015 |
| JP | 2011-073252 A | 4/2011 |

* cited by examiner

SELF-LOCKING MOLD COMPRISING A SHOULDER SPACER FOR MOLDING AND VULCANIZATION OF TIRES

TECHNICAL FIELD

The invention relates to the field of tire manufacture and more particularly to the vulcanization of tires using self-locking molds.

CONTEXT

In order to perform the vulcanization of tires, certain molds are used that are self-locking molds having shells and complementary sectors that are brought together by an external mechanism to delimit a toroidal molding space. They essentially include two shells for molding the sidewalls of the tire, and several peripheral sectors situated between the shells for molding the tread. The assembly of all of these parts is ensured by a mechanism external to the mold.

The raw blank of the tire to be vulcanized is introduced into the mold, and a curing membrane firmly presses the tire against the mold so as to impart the tread pattern and obtain a vulcanized tire of precise dimensions. In general, the pressure exerted by the tire on the mold parts is borne by mechanisms that transfer the forces to the chassis of the curing press in order to keep the mold closed during the entire cure time.

Figure 1:
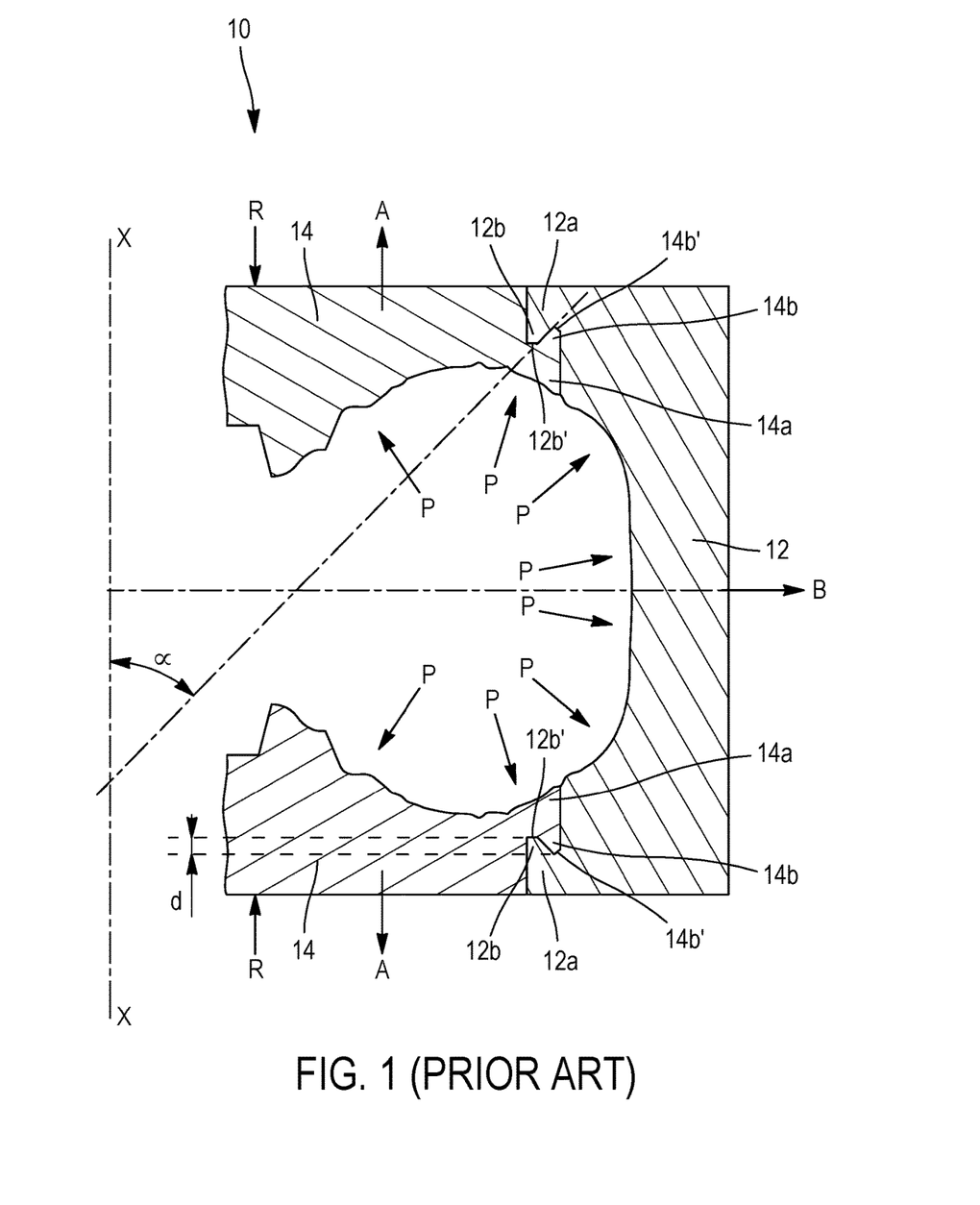
FIG. 1 is a self-locking mold of the prior art.

FIG. 1 shows a self-locking mold 10 in which an internal pressure P is compensated by the recovery of forces by hooks 12a and 12b. Mold 10 also includes shells 14 each having a complementary projection 14a and a complementary flange 14b. To ensure closure of the mold 10, frustoconical bearing surfaces 12b', 14b' are provided and are inclined at an angle α with respect to the axis X-X. The angle α is calculated so that the effect of the internal pressure P on the shells 14 (tending to impart axial movement to the shells 14 as indicated by the arrows A) is dominant with respect to the effect of the pressure on sectors 12 (tending to impart radial movement to the sectors 12, as indicated by arrow B). Publications EP0436495 and FR2983117 describe a mold of this type.

Self-locking molds include components that provide high forces and the ability to facilitate opening and closing of the mold. When the design of the tire is altered (e.g., to alter a tread width relative to a sidewall), the collaboration between the sectors and the shells must also be modified without introducing friction between the component interfaces.

SUMMARY

The invention provides a self-locking mold for molding and vulcanizing a tire comprising a shell and a plurality of sectors circumferentially distributed around the shell to resist internal pressure and remain in a closed position without the aid of additional components during molding. The shell and the sectors have complementary surfaces for axially and radially locking the shell and the sectors when the mold is closed. The shell includes an external element having an outer surface and an opposing inner surface, and an outer side surface and an opposed inner side surface, and a projection that axially extends from the inner side surface and having an annular groove with a frustoconical surface. The shell also includes an internal element with an outer boundary and an opposite inner boundary, and an outer lateral boundary and an opposed inner lateral boundary. The mold includes at least one shoulder spacer that is disposed intermediate the shell and the sectors in the closed position of the mold. The mold also includes an elastic means that maintains a space between each shoulder spacer and a respective inner lateral boundary, wherein maintaining the space corresponds to maintaining a distance sufficient to cause each shoulder spacer to avoid friction along an interface between the shoulder spacer and the sector.

For certain embodiments of the invention, the means for maintaining a sufficient distance includes elastic means disposed between an upper shoulder spacer and the shell. For certain embodiments, the elastic means includes one or more springs.

For certain embodiments of the invention, the shoulder spacer, in the closed position of the mold, engages an engagement recess.

For certain embodiments of the invention, each shoulder spacer has a locking member that is placed in a space created by an interface of an inner surface of an external shell element, an inner lateral boundary of an internal shell element and a cantilever of the sector.

For certain embodiments of the invention, a predetermined minimum distance X is maintained between the inner surface of the external element of the shell and both of an inner periphery of a member of the locking member and an upper face of the cantilever. A zone Y is located between two frustoconical surfaces, and X is greater than Y.

The invention also provides a method for vulcanizing one or more tires using the self-locking mold.

The invention also proposes a tire formed by the self-locking mold.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Hereinafter, elements will refer in detail to embodiments of the invention, one or more examples of which are illustrated in the drawings. Each example is provided by way of explanation and not limitation of the invention. The selected combinations of the technology correspond to a plurality of different embodiments of the present invention. Those skilled in the art will appreciate that various modifications and variations may be applied. For example, features or steps illustrated or described in one embodiment may be used with one or more further embodiments to define at least one additional embodiment. In addition, certain features may be exchanged with similar devices or features not specifically mentioned which perform the same or a similar function. Thus, it is intended that the present invention cover these modifications and variants insofar as they fall within the scope of the appended claims and their equivalents.

The invention includes devices and methods for producing vehicle tires, including tires having variable and adaptable properties. As used herein, the term "tire" or "tires" includes, but is not limited to, tires used for light vehicles, passenger cars, utility vehicles (especially heavy goods vehicles), (including, but not limited to, bicycles, motorcycles, off-road vehicles, etc.), agricultural vehicles, industrial vehicles, mining vehicles and engineering machines. It is also understood that the products manufactured by the invention include integral and partial treads such as those used in known retreading processes.

A self-locking mold according to the invention includes shells and sectors that collaborate in order to resist internal pressure. These molds are characterized by force-limiting means consisting of bearing surfaces that contact one another when the internal pressure in the mold exceeds a predetermined threshold. As the pressure increases, the forces exerted between the shell and the sector increase the clamping forces of the mold. A corner effect is limited since the forces are distributed between the bearing surfaces along the interfaces between the shells and the sectors. The mold thus remains closed without the aid of additional external components.

Figure 2A:
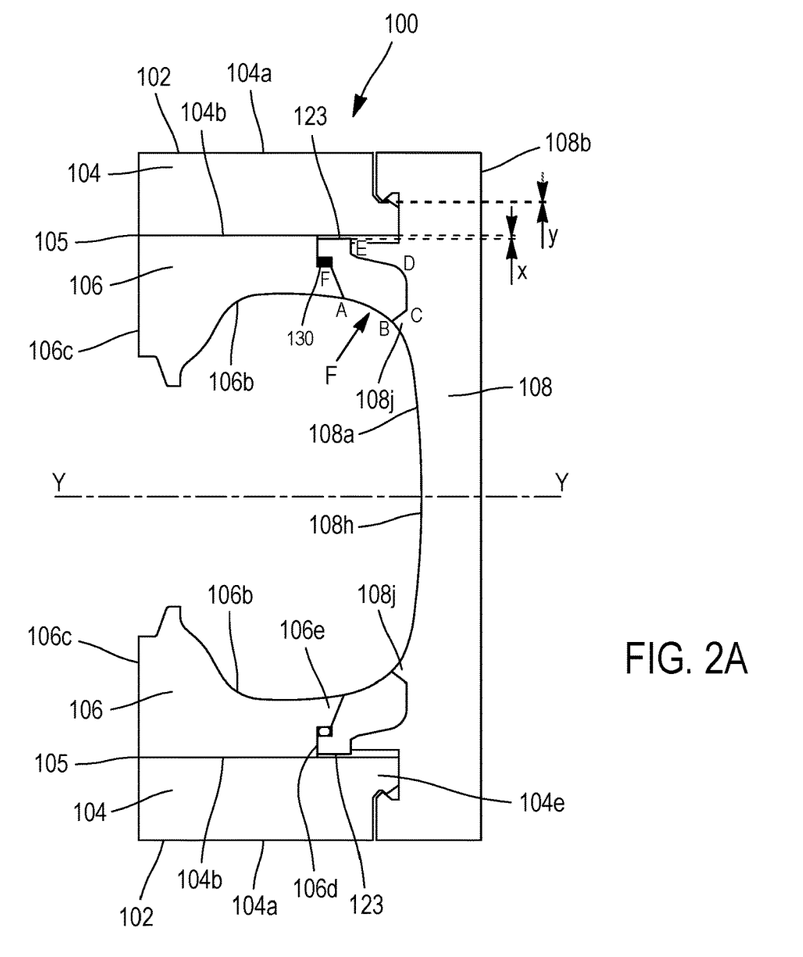
FIG. 2A is a radial cross-sectional view of a self-locking mold in a curing position.

A self-locking mold 100 is provided in FIGS. 2A to 5 that includes upper and lower shells 102 having one or more sectors 108 circumferentially distributed around them. Shells 102 and sectors 108 are associated with known opening and closing means (not shown) that impart an axial movement to the shell and a radial movement to the sectors. As shown in FIG. 2A, mold 100 is in a closed position corresponding to the position in which the internal pressing forces act on the shells and the sectors (e.g., during curing).

Each shell 102 includes an external element 104 proximate the opening and closing means and an internal element 106 in contact with the tire for the molding thereof. Each external element 104 includes an outer surface 104a and an opposite inner surface 104b which defines an interface between the external and internal elements. An outer lateral surface 104c is coextensive with respect to surfaces 104a and 104b and opposite an inner lateral surface 104d. A projection 104e extends axially from inner lateral surface 104d and has an annular groove 104f delimited by an annular rib 104g having a frustoconical surface 104g'.

Internal element 106 includes an outer boundary 106a that with inner surface 104b of external element 104 forms an interface 105 between the external and internal elements of shell 102. An opposite inner boundary 106b is configured to mold at least a portion of the sidewall and the bead area of the tire. An outer lateral boundary 106c, which is coextensive with boundaries 106a and 106b, is opposite an inner lateral boundary 106d.

Each sector 108 includes respective inner and outer edges 108a, 108b and respective upper and lower edges 108c, 108d coextensive therewith. A projection 108e extends radially from each edge 108c, 108d toward inner lateral surface 104d of external element 104. Each projection 108e includes an annular groove 108f delimited by an annular rib 108g having a frustoconical surface 108g'. Annular grooves 104f, 108f and respective annular ribs 104g, 108g form complementary surfaces for the axial and radial locking of shell 102 and sector 108 when mold 100 is closed. A zone "Y" is situated between the two frustoconical surfaces 104g', 108g'. In some embodiments, the value of zone Y may be about 2 mm.

Inner edge 108b of sector 108 includes a tread molding portion 108h disposed inside mold 100 and incorporating one or more tread elements designed to be molded in the tire (not shown). The tread elements may include one or more different tread molding elements. Tread molding portion 108h may have boundary elements 108j that delimit a tread molding area. Sector 108 and tread molding portion 108h may comprise one-piece as shown or may be alternatively produced as separate components.

For each sector 108, a cantilever 110', 110" extending from inner edge 108a is disposed between each boundary element 108j and a corresponding edge 108c, 108d. Each cantilever 110', 110" includes an upper face 110a, a lower face 110b and a coextensive flank 110c. Upper face 110a of an upper cantilever 110' is disposed near inner surface 104b of external element 104 when mold 100 is closed. Lower face 110b of a lower cantilever element 110" is disposed in the vicinity of inner surface 104b of external element 104 when mold 100 is closed. An engagement recess 112 that is delimited between each cantilever 110', 110" and a corresponding boundary element 108j includes an upper engaging portion 112a and a lower engaging portion 112b. Engagement recess 112 can be seen in more detail with respect to FIG. 5.

Sector 108 may be selected from sectors that have different tread patterns along tread molding portion 108h. It is contemplated that a selected sector 108 may be interchangeable with a non-selected sector.

Figure 2B:
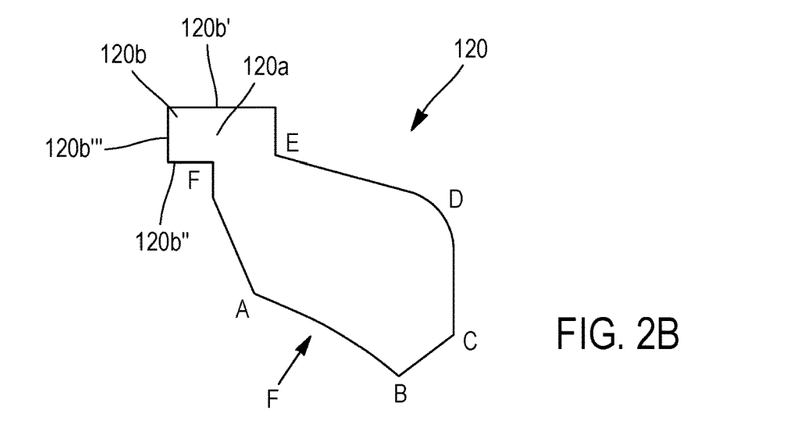
FIG. 2B is a sectional view of a shoulder spacer of a self-locking mold of FIG. 2A.

Mold 100 also includes upper and lower shoulder spacers 120. Each shoulder spacer 120 engages a corresponding engagement recess 112. Each shoulder spacer 120 includes a generally concave interface AB turned inwardly toward the Y-Y axis of the mold and corresponding to a portion of the tire profile. Each shoulder spacer 120 includes an interface BC that cooperates with a corresponding engaging portion 112b when mold 100 is closed. An interface DE of each shoulder spacer cooperates with a corresponding engaging portion 112a when mold 100 is closed. Another interface AF cooperates with a complementary protuberance 106e that extends axially outwardly from inner lateral boundary 106d of internal element 106. When mold 100 is closed, each engagement recess 112 engages a respective shoulder spacer 120 along interfaces BC and DE. More particularly, engaging portion 112a engages a shoulder spacer 120 along interface BC, and engaging portion 112b engages a shoulder spacer 120 along interface DE.

Each shoulder spacer 120 includes a locking member 120a that is placed in a space 123 created by the interface of inner surface 104b of external element 104, inner lateral boundary 106d of internal element 106 and cantilever 110', 110" of sector 108. Locking element 120a includes a member 120b that protrudes axially towards internal lateral boundary 106d of internal element 106. The member 120b has an outer periphery 120b' close to internal surface 104b of external element 104 and an inner periphery 120b" positioned proximate protuberance 106e. When mold 100 is closed, outer periphery 120b' is generally aligned with upper face 110a of upper cantilever 110'. To carry out the optional removal of sector 108, a minimum distance X is maintained between these aligned surfaces and internal surface 104b. A lateral periphery 120b''' cooperates with inner lateral boundary 106d of internal element 106.

As indicated by the arrow F in FIG. 2B, during curing, each shoulder spacer 120 is subjected to the internal pressure of mold 100, in particular along sector AB. In the closed position, frustoconical surfaces 104g', 108g' come into contact in reaction to the closing forces produced by the pressure exerted on shells 102 and sectors 108. In order to ensure a sufficient wedging effect while maintaining a sufficient space between shells 102 and sector 108 upon opening of mold 100, shells 102 must be closed such that X is greater than Y. It is contemplated that the frustoconical surfaces 104g', 108g' cooperate with each other when the pressure in mold 100 reaches a predetermined value, which value depends upon the particular configuration of the tire.

In order to limit the friction on the interface BC of an upper shoulder spacer 120', the invention envisages the use of an elastic means for maintaining the space 123 between each shoulder spacer 120 (and in particular the locking element 120a) and a respective internal element 106. Maintaining space 123 corresponds to maintaining a sufficient distance so that each shoulder spacer 120 avoids friction with the sector along the intersection BC.

In some embodiments, gravity is compensated by one or more springs 130 disposed in space 123 between upper shoulder spacer 120' (and in particular locking element 120a thereof) and internal element 106 (and in particular protuberance 106e thereof). When mold 100 is closed as shown in FIG. 2A, spring 130 is compressed. The minimum distance X prevents mechanical blockage during mold opening pending the axial approach of shells 102. Spring 130 may be one spring or several springs that are arranged radially in space 123. Springs 130 are positioned to avoid friction between interface BC and the sector in order to limit the phenomena of wear and/or gripping.

In some embodiments, a spring 130 or a plurality of springs 130 may also be provided in space 123 in the vicinity of lower shoulder spacer 120". Springs 130 are not limited to one type of spring configuration and may include one or more configurations, including but not limited to coil springs, leaf springs, balance springs and their complements and equivalents. For example, one or more Belleville washers may be used. In another example, mold 100 can rely on the elastic deformation of at least one element selected from external element 104, internal element 106 and one or both shoulder spacers 120.

Figure 3:
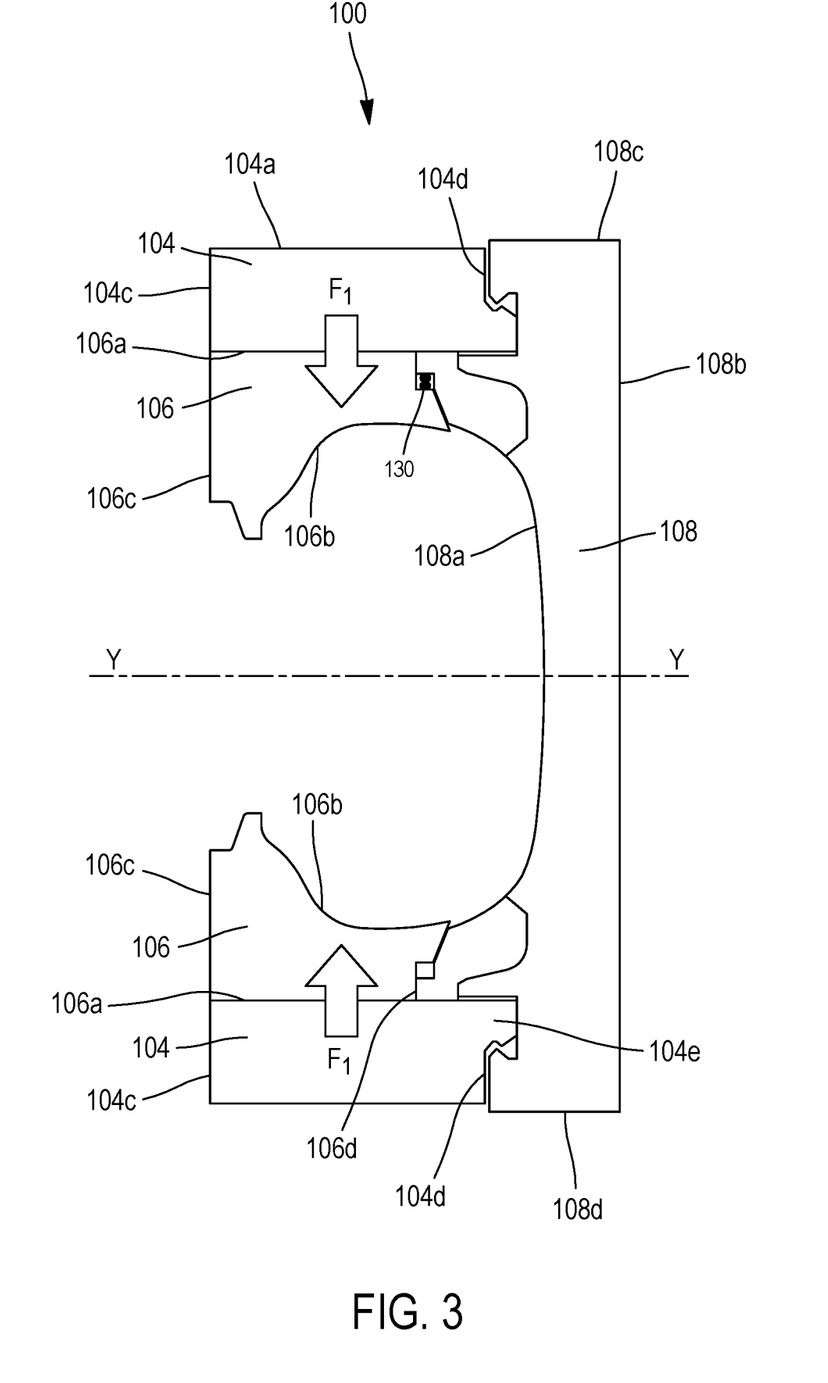
FIG. 3 is the self-locking mold of FIG. 2A at the beginning of a procedure of opening of the mold.

As indicated by the arrows F1 of FIG. 3, closing forces are applied to mold 100 to begin removal of sector 108. By applying the forces F1, shell 102 (including external element 104 and internal element 106) and shoulder spacers 120 move axially towards the central axis Y-Y to release the latch between annular grooves 104f, 108f and corresponding annular ribs 104g, 108g (for example, by axially displacing the complementary locking surfaces). Spring 130 consequently extends to relieve the friction between interface BC of upper shoulder spacer 120' and engaging portion 112b. For embodiments that include elastic means disposed relative to lower shoulder spacer 120", these elastic means operate in a similar manner.

Figure 4:
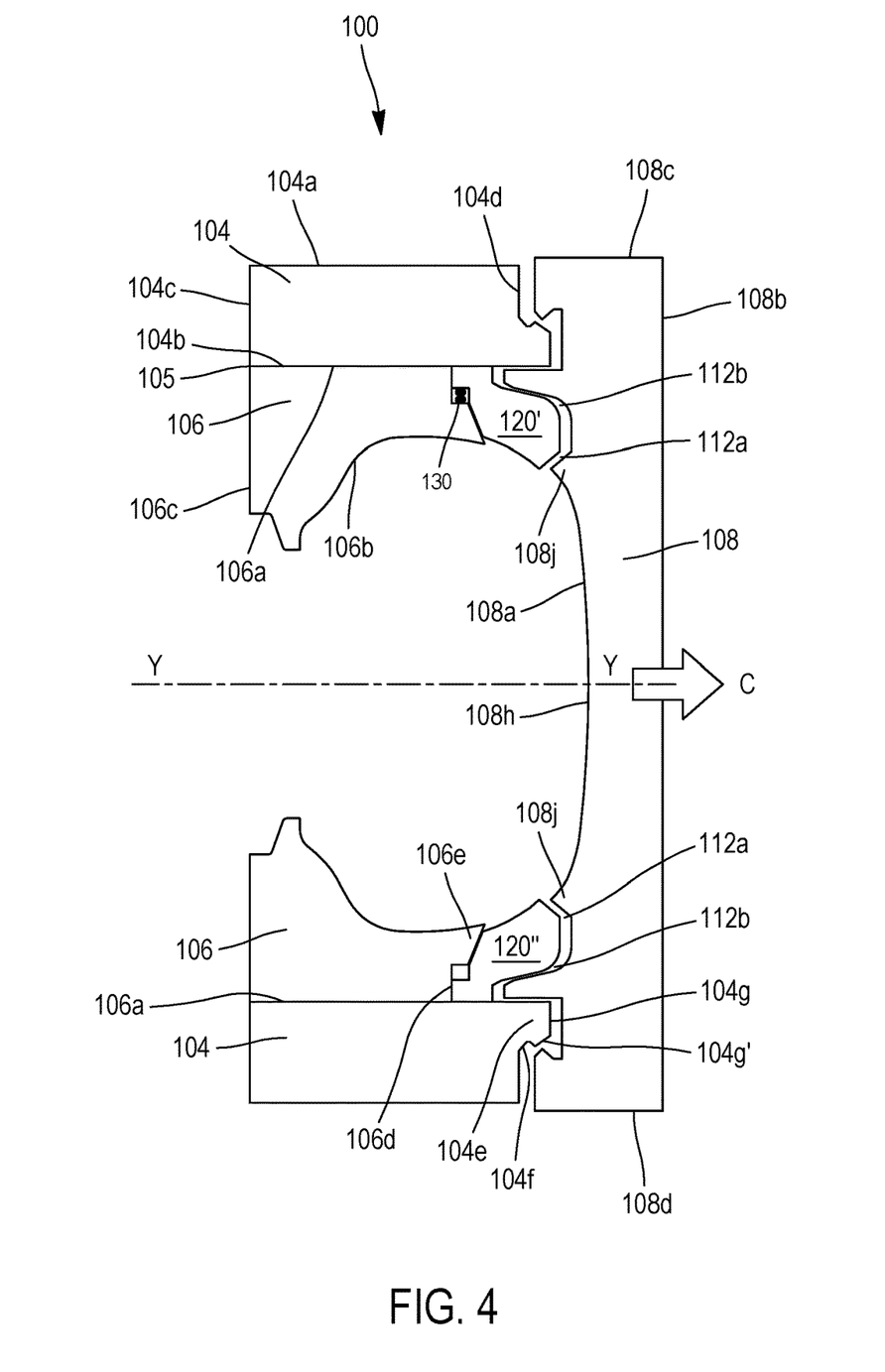
FIGS. 4 and 5 show the self-locking mold of FIGS. 2A and 3 during retraction of a sector of the mold.
Figure 5:
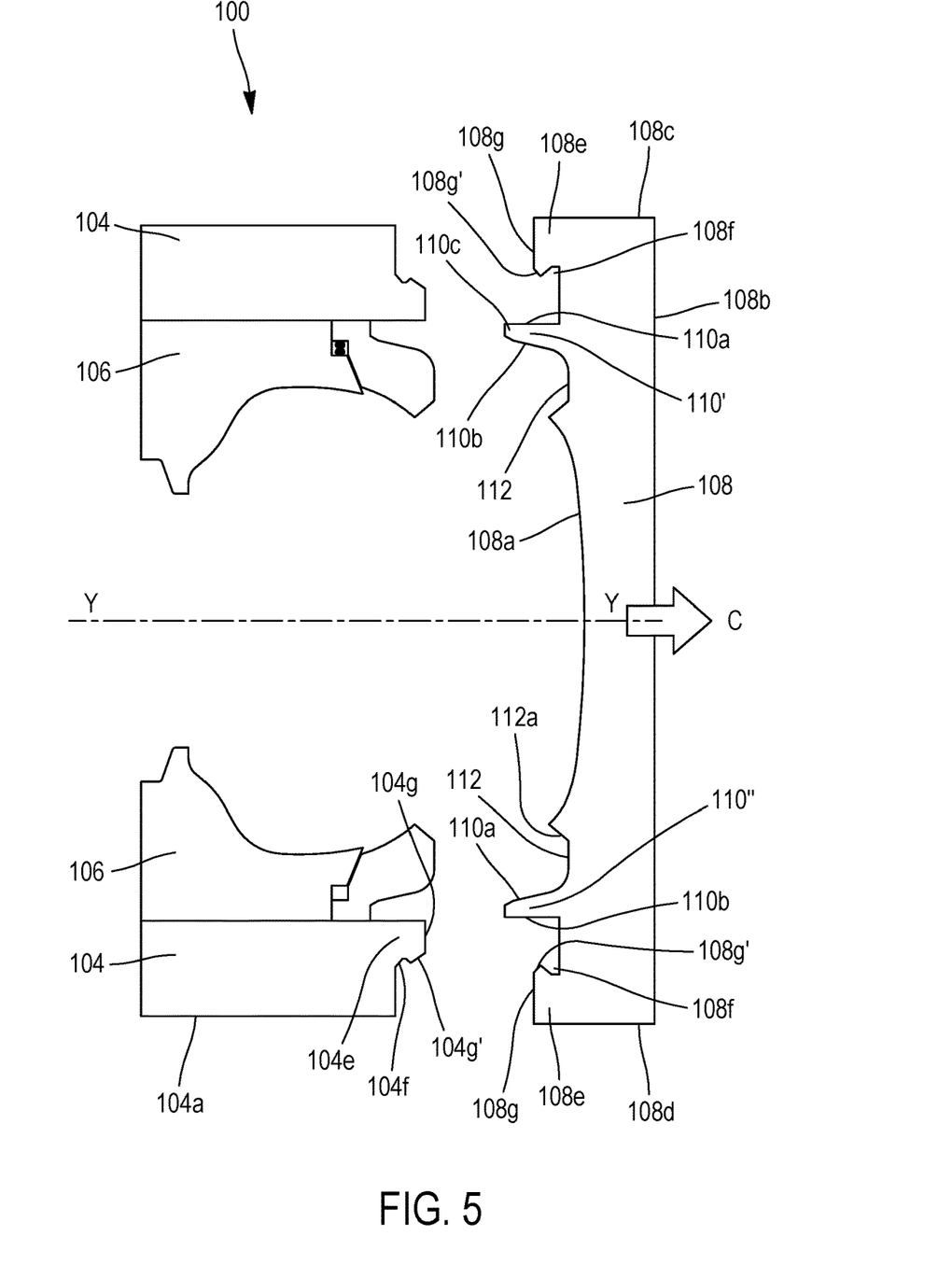

As indicated by the arrow C of FIG. 4 and FIG. 5, sector 108 is retracted radially with respect to the assembly of shell 102 and shoulder spacers 120. Since friction has been avoided along interface BC of upper shoulder spacer 120', the minimum tolerance between annular grooves 104f, 108f and annular ribs 104g, 108g is respected even when there is a change in the design of the tire. Upon complete removal of sector 108, as shown in FIG. 5, a molded tire may be removed from the mold and the mold may be prepared for a subsequent curing cycle.

During the opening and closing of mold 100, between the upper shoulder spacer and the lower shoulder spacer, the movements are substantially the same. There is a small difference with the higher position of spring 130, which enables separation of the shoulder spacer from the shell, whereas in the lower position, this separation is generated by gravity in sliding along interface DE. If there is no spring in the higher position, it is the sector that maintains the shoulder spacer in the BCDE groove until the sector retracts and the shoulder spacer slides along interface BC and contacts the shell. When the sector approaches, it comes back together with the shoulder spacer along interface BC.

The invention demonstrates solutions for preserving the beneficial characteristics of self-locking molds, even when a change in tire design is implemented. The invention ensures the preservation of the tight tolerances while reducing the friction along the interfaces between the elements of the mold. By ensuring adequate separation of the sector from the elements of the shell, the invention lends itself to the vulcanization of configurations of multiple tires while preserving the beneficial properties of known self-blocking molds.

At least some of the various molding techniques can be implemented in connection with hardware or software or, if warranted, with a combination of both. The processing functionality may correspond to any type of computing device that includes one or more processing devices. The computer device may comprise any type of computer, computer system or other programmable electronic device, in particular a client computer, a server computer, a portable computer (especially a laptop and a tablet), a handheld computer, a mobile telephone (particularly a smart phone), a gaming device, an integrated controller, a near field communication device, a device with applications implemented at least partially using a cloud service, or any combination and/or any equivalent thereof (especially non-contact devices). In addition, the computing device can be implemented using one or more networked computers, e.g. in a cluster or other distributed computing system.

The dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" may include one or more steps performed at least by one electronic or computer-based apparatus having a processor for executing instructions that carry out the steps.

The terms "at least one" and "one or more" are used interchangeably. Ranges that are described as being "between a and b" are inclusive of the values for "a" and "b."

The citation of any document does not imply that it is a technique inferior to any invention described or claimed or that alone or combined in any way with another reference or other references whatsoever, it teaches, suggests or describes this invention. In addition, to the extent that any meaning or definition of a term in this document conflicts with any meaning or definition of the same term in a document incorporated by reference, it is the meaning or definition assigned to that term in this document will prevail.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

The invention claimed is:

1. A self-locking mold for molding and vulcanizing a tire, the mold comprising:
   a shell;
   a plurality of sectors circumferentially distributed around the shell, each sector being structured to resist an internal pressure such that the mold remains in a closed position without aid of supplementary components during a molding procedure;
   at least one shoulder spacer, each shoulder spacer being disposed intermediate the shell and a corresponding one of the sectors when the mold is in the closed position; and
   at least one elastic separator, each elastic separator structured to maintain a space between a corresponding shoulder spacer and an inner boundary of the shell, the space being sufficient to enable the corresponding shoulder spacer to avoid friction along an interface between the corresponding shoulder spacer and a sector corresponding to the corresponding shoulder spacer,
   wherein the shell and the sectors have complementary surfaces structured to lock the shell and the sectors axially and radially when the mold is in the closed position,
   wherein the shell includes:
      an external element having:
         an outer surface and an opposite inner surface,
         an outer lateral surface and an opposite inner lateral surface, and
         a projection that extends axially from the inner lateral surface and that has an annular groove and an annular rib having a frustoconical surface, and
      an internal element having:
         an outer boundary and an opposite inner boundary, and
         an outer lateral boundary and an opposite inner lateral boundary.

2. The self-locking mold according to claim 1,
   wherein each sector includes:
      an outer edge,
      an inner edge,
      an upper edge coextensive with the inner and outer edges,
      a lower edge coextensive with the inner and outer edges,
      an upper projection extending radially from the upper edge toward the inner lateral surface of the external element, the upper projection having an annular groove delimited by an annular rib having a frustoconical surface, and
      a lower projection extending radially from the lower edge toward the inner lateral surface of the external element, the lower projection having an annular groove delimited by an annular rib having a frustoconical surface, and
   wherein, for each sector, the grooves and the ribs of the sector lock with the groove and the rib of the external element during a curing procedure.

3. The self-locking mold according to claim 2,
   wherein the inner edge of each sector includes a tread molding portion that incorporates at least one tread element intended to be molded in a tire being manufactured, and
   wherein each tread molding portion includes boundary elements that define a tread molding area.

4. The self-locking mold according to claim 3,
   wherein each sector includes an upper cantilever and a lower cantilever, each cantilever extending from the inner edge of the sector, each cantilever being disposed between a corresponding boundary element of the sector and a corresponding edge of the sector, and each cantilever including an upper face, a lower face, and a flank coextensive with the upper and lower faces,
   wherein the upper face of the upper cantilever is disposed near the inner surface of the external element when the mold is in the closed position, and
   wherein the lower face of the lower cantilever is disposed near the inner surface of the external element when the mold is in the closed position.

5. The self-locking mold according to claim 4, further comprising, for each cantilever, an engagement recess that is delimited between the cantilever and the boundary element corresponding to the cantilever,
   wherein each engagement recess has an upper engaging portion and a lower engaging portion.

6. The self-locking mold according to claim 5,
   wherein the at least one shoulder spacer is a plurality of shoulder spacers, and
   wherein, when the mold is in the closed position, each shoulder spacer engages with a corresponding engagement recess.

7. The self-locking mold according to claim 6, wherein each shoulder spacer includes:
   a concave interface AB structured to turn inwardly toward a mold axis Y-Y,
   a sector interface BC that engages a corresponding upper engaging portion when the mold is in the closed position,
   an interface DE structured to engage a corresponding lower engaging portion when the mold is in the closed position, and
   an interface AF that engages a complementary protuberance that extends axially outwardly from the inner lateral boundary of the internal element when the mold is in the closed position.

8. The self-locking mold according to claim 7, wherein each shoulder spacer includes a locking element that is positioned in a space delimited by the inner surface of the external element, the inner lateral boundary of the internal element, and one of the cantilevers of a corresponding sector.

9. The self-locking mold according to claim 8, wherein each locking element includes a member that extends axially towards the inner lateral boundary of the internal element, the member having an outer periphery proximate the inner surface of the external element and an opposite inner periphery positioned proximate the protuberance of the internal element, the outer periphery being aligned with the upper face of the upper cantilever of a corresponding sector when the mold is in the closed position.

10. The self-locking mold according to claim 9, wherein, for each locking element, when the mold is in the closed position:
   a predetermined minimum distance X is established between the inner surface of the external element and both the outer periphery of the member of the locking element and the upper face of the upper cantilever of a corresponding sector,
   a distance Y is situated between a frustoconical surface of the external element and a frustoconcial surface of the corresponding sector, and
   X is greater than Y.

11. The self-locking mold according to claim 10, wherein the distance Y has a value of about 2 mm.

12. The self-locking mold according to claim 8, wherein the elastic separator includes at least one spring, each spring being radially positioned in the space.

13. The self-locking mold according to claim 1, wherein at least one of the sectors has tread pattern elements positioned along a tread molding portion.

14. A method for vulcanizing a tire, the method comprising:
- (A) providing a self-locking mold that includes:
- a shell;
- a plurality of sectors circumferentially distributed around the shell, each sector being structured to resist an internal pressure such that the mold remains in a closed position without aid of supplementary components during a molding procedure;
- at least one shoulder spacer, each shoulder spacer being disposed intermediate the shell and a corresponding one of the sectors when the mold is in the closed position; and
- at least one elastic separator, each elastic separator structured to maintain a space between a corresponding shoulder spacer and an inner boundary of the shell, the space being sufficient to enable the corresponding shoulder spacer to avoid friction along an interface between the corresponding shoulder spacer and a sector corresponding to the corresponding shoulder spacer, wherein the shell and the sectors have complementary surfaces structured to lock the shell and the sectors axially and radially when the mold is in the closed position, wherein the shell includes:
- an external element having: an outer surface and an opposite inner surface, an outer lateral surface and an opposite inner lateral surface, and a projection that extends axially from the inner lateral surface and that has an annular groove and an annular rib having a frustoconical surface, and
- an internal element having: an outer boundary and an opposite inner boundary, and an outer lateral boundary and an opposite inner lateral boundary; and (B) vulcanizing a tire in the mold.

* * * * *